3,189,558
BIS(PHENYLTOLYL)ETHER CHROMATOGRAPHIC
ADSORPTION MEDIA
James D. Doedens, 20 Rosemary Court, Midland, Howard
P. Cordts, 5448 Kasemeyer Road, Bay City, and David
F. Wisniewski, 4869 Franklin St., Auburn, Mich.
No Drawing. Original application Aug. 31, 1959, Ser. No.
836,927. Divided and this application June 3, 1964,
Ser. No. 378,431
3 Claims. (Cl. 252—428)

This application is a division of U.S. patent application Serial No. 836,927, filed August 31, 1959.

This invention concerns new chemical compositions which are liquid condensation products of a benzenoid hydrocarbon having up to two alkyl substituents containing from 1 to 2 carbon atoms with 4,4'-di(chloromethyl)diphenyl oxide, hereinafter abbreviated as

DCMDPO

It also concerns their method of manufacture.

The new compounds of this invention are unusually effective as adsorbents in chromatography, particularly vapor phase chromatography.

The products of this invention are prepared by a condensation or alkylation in the presence of a Friedel-Crafts catalyst, e.g., $ZnCl_2$, $FeCl_3$, $BF_3$, etc., involving two moles of benzenoid hydrocarbon per mole of DCMDPO when the dialkyl benzenes are coreactants, 3 moles of benzenoid hydrocarbon per two moles of DCMDPO when benzene is the coreactant and a mixed condensate of 2 and 3 moles of benzenoid hydrocarbon per 1 and 2 moles of DCMDPO when a monoalkylbenzene is the coreactant. For example, bis($\alpha$-x-xylyl-p-tolyl)ether is produced when 2 molar proportions of xylene are condensed with one mole of DCMDPO, x representing a position on the benzene nucleus, $\alpha,\alpha'$-bis((p-($\alpha$-phenyl-p-tolyloxy)phenyl))-p-xylene is produced when 3 moles of benzene are condensed with 2 moles of DCMDPO, a mixture of approximately 70 weight percent of bis($\alpha$-x-tolyl-p-tolyl)ether and approximately 30 percent 2-methyl-1,4-bis((p-($\alpha$-x-tolyl-p-tolyloxy)benzyl)) benzene is produced when toluene present in excess is condensed with DCMDPO, and a mixture of the analogous ethyl homologs, approximately 70 weight percent bis($\alpha$-x-ethylphenyl-p-tolyl)ether and approximately 30 percent 2-ethyl-1,4-bis((p-($\alpha$-x-ethylphenyl-p-tolyloxy)benzyl)) benzene is produced when ethylbenzene present in excess is condensed with DCMDPO. The ethylbenzene and toluene condensation products have mainly para-substitution with a small amount of ortho-substitution. The xylene condensate has mainly 1,2,4-substitution with a small amount of 1,2,3- and 1,2,6-substitution. The indicated positions are those of the alkyl substituents of the benzenoid hydrocarbon moieties relative to the 4,4'-dimethylene diphenyl oxide moieties, hereinafter referred to as diphenyl oxide moieties.

The reaction is carried out by reacting the benzenoid hydrocarbon, present in stoichiometric excess over the DCMDPO, e.g., more than 2 moles of the former to one of the latter, and sufficient in any event to dissolve all of the DCMDPO at reaction temperature in the presence of a small catalytic amount of a Friedel-Crafts catalyst, generally from a trace up to 2 weight percent, DCMDPO basis. A simple trial suffices to determine the amount of benzenoid hydrocarbon sufficient to dissolve the DCMDPO. A reaction temperature between 45° C. and the boiling point of the benzenoid hydrocarbon, generally between 50° and 150° C. and preferably at the boiling point of the benzenoid hydrocarbon reactant is used. Excess benzenoid hydrocarbon acts as a moderating diluent, also expedites reaction in accordance with Le Chatelier's Law and, further, presents self-condensation of the DCMDPO. The reaction is carried out until hydrogen chloride evolution has stopped. At lower temperatures, as expected, longer reaction times are required. But no effect on yield is noted at any point within the operable reaction temperature range provided sufficient time is allowed for all of the hydrogen chloride to be evolved.

The liquid products referred to herein were identified by infrared analysis together with molecular weight determinations.

The DCMDPO can be prepared by the method of Tomita et al., Jl. Pharm. Soc. Jap. 70:44 (1950).

The following examples are in illustration of the invention and not in limitation thereof. Parts and percentages therein are by weight.

EXAMPLE 1.—REACTION OF DCMDPO WITH XYLENE

Charge:
    107 g. (0.4 mol) DCMDPO
    856 g. (8.07 mol) xylene
    4 g. zinc chloride The above reactants were charged to a 2-liter 3-necked pot equipped with a mechanically driven agitator and two reflux condensers. Heat was applied gradually to 74° C., at which temperature HCl was evolved vigorously. When the HCl evolution had slowed down, the temperature was increased to 135° C. and was held there for 10 hours. The reaction mixture was then cooled and transferred to a separatory funnel where it was washed twice with water, once with aqueous 5 percent $NaHCO_3$ solution, and again with water. After the final separation, the mixture was filtered and stripped to 120° C. at 25 mm. Hg to rid it of xylene. The residue was then transferred to another still and stripped of solvent to a pot temperature of 270° C. at 0.7 mm. Hg. A quantity of 127 g. liquid product was recovered for a 79.5 percent yield, DCMDPO basis, identified as bis($\alpha$-x-xylyl-p-tolyl)ether by infrared analysis and a molecular weight of 400 (calcd. 406).

EXAMPLE 2.—REACTION OF DCMDPO WITH ETHYLBENZENE

Charge:
    107 g. (0.4 mole) DCMDPO
    862 g. (8.07 mole) ethylbenzene
    4 g. zinc chloride The procedure of Example 1 was repeated. The washed, filtered organic phase was stripped to 250° C. at 0.7 mm. Hg to remove ethylbenzene. A quantity of 115 g. liquid product was recovered for a 71 percent yield. It was identified as a mixture of approximately 70 weight percent bis($\alpha$-x-ethylphenyl-p-tolyl)ether and approximately 30 percent 2 - ethyl-1,4-bis((p-($\alpha$-x-ethylphenyl-p-tolyloxy)-benzyl)) benzene by infrared analysis and a molecular weight of 500 (calcd. for 70:30 mixture, 497).

EXAMPLE 3.—REACTION OF DCMDPO WITH TOLUENE

A quantity of DCMDPO (534 g., 2 moles) dissolved in toluene (1732 g., 18.8 moles) containing 20 g. zinc chloride was added to a 3-liter 3-necked round bottomed flask equipped with a mechanical agitator, reflux condenser, and thermometer. It was heated with agitation at reflux of the toluene for 2 hours. During the reaction time, HCl was vented through the reflux condenser and a scrubber. The reaction mixture was cooled to 25°–30° C. with agitation. It was then washed three times with an equal volume of cold water, once with aqueous 5 percent sodium bicarbonate solution, and again with water until the aqueous phase was neutral. The excess toluene and any water was stripped off at a temperature of 250° C. at 2 mm. Hg. Liquid product amounting to 690 g.

was identified as a mixture of ca. 70 weight percent bis-(α-x-tolyl-p-tolyl) ether and ca. 30 percent 2-methyl-1,4-bis((p-(α-x-tolyl-p-tolyloxy)benzyl)) benzene by infrared analysis and by a molecular weight of 458 (calculated for 70:30 mixture, 462).

EXAMPLE 4.—REACTION OF DCMDPO WITH BENZENE

A quantity of 1.87 ml. (500 g.) DCMDPO was dissolved in 1500 g. (19.2 moles) benzene. To this solution was added 30 g. aluminum chloride catalyst. The reaction mixture was heated to reflux in a 2-liter 3-necked flask equipped with a reflux condenser, thermometer and mechanical agitator. The reaction mixture was held at 60–65° C. for 2 hours, after which no more HCl evolution was noted. It was then cooled to 50° C. and poured into chilled water. The organic layer was separated, washed with water, with aqueous 5 percent NaHCO₃ solution and again with water. The benzene was then stripped off to a pot temperature of 200° C. A quantity of 629 g. liquid product was recovered for a 96.1 percent yield based on DCMDPO. The product was identified as α,α′-bis((p-(α-phenyl-p-tolyloxy)phenyl))-p-xylene by infrared analysis and by a molecular weight of 611 (calculated 620).

EXAMPLE 5

The following table illustrates the value in adsorption chromatography of a mixture of about 70 weight percent of bis(α-x-tolyl-p-tolyl) ether and about 30 weight percent of 2-methyl-1,4-bis((p-(α-x-tolyl-p-tolyloxy)benzyl)) benzene loaded on a column of diatomaceous earth, a conventional particulate inert packing material. In general, the data are presented similarly to the presentation of Scholly and Brenner, "Proceedings 1959, 2nd Biannual International Gas Chromatography Symposium," pp. 111–140, Instrument Society of America, 313 Sixth Avenue, Pittsburgh 22, Pa., 1959, except that instead of giving the time in minutes for a component species to emerge, there is given the retention volume, $R_v$, of the gas corrected to 760 mm. and 0° C.

*Table I*

Conditions Employed:
Inlet pressure=15.1 cm. Hg in all cases (helium gas)
Flow (ml./min.)=29.1 at 99.7° C., 31.3 at 79.7° C., 35.6 at 55.8° C., and 41.5 at 24.7° C.
Weight of stationary liquid phase on column 13.2 g.
Length and diameter of column 288 cm. x 0.6 cm.

[$R_v$ values at various temperatures]

| Compound | B.P. (° C.) | Temp. | $R_v$ (ml./min. corr.) | $R_v/R_v$ (pentane) |
|---|---|---|---|---|
| Saturated paraffins: | | | | |
| Pentane | 36.1 | 99.7 | 49 | 1.00 |
|  |  | 24.7 | 280 | 1.00 |
| Hexane | 68.7 | 99.7 | 102 | 2.09 |
|  |  | 79.7 | 165 | 2.28 |
| Heptane | 98.4 | 99.7 | 212 | 4.32 |
|  |  | 79.7 | 371 | 5.12 |
| Octane | 125.7 | 99.7 | 406 | 8.35 |
| Unsaturated and branched paraffins: | | | | |
| Pentene-1 | 30.0 | 99.7 | 51 | 1.04 |
|  |  | 24.7 | 322 | 1.16 |
| cis-Pentene-2 | 36.9 | 99.7 | 64 | 1.31 |
| 2-methyl butane | 27.9 | 99.7 | 35 | 0.71 |
|  |  | 24.7 | 192 | 0.69 |
| 2-methyl-1-butene | 31.2 | 99.7 | 55 | 1.11 |
|  |  | 24.7 | 356 | 1.28 |
| 2-methyl-1,3-butadiene | 34.1 | 99.7 | 78 | 1.57 |
|  |  | 24.7 | 577 | 2.07 |
| Halogenated paraffins: | | | | |
| Methylene chloride | 40.0 | 99.7 | 170 | 3.45 |
|  |  | 24.7 | 1,595 | 5.77 |
| Chloroform | 61.3 | 99.7 | 332 | 6.73 |
|  |  | 79.7 | 582 | 8.04 |
| Carbon tetrachloride | 76.7 | 99.7 | 363 | 7.35 |
|  |  | 79.7 | 625 | 8.87 |
| Ethylbromide | 38.4 | 99.7 | 140 | 2.84 |
| n-Propylbromide | 71.0 | 99.7 | 306 | 6.17 |
| iso-Propylbromide | 59.4 | 99.7 | 201 | 4.08 |
| n-Butylbromide | 101.6 | 99.7 | 634 | 12.9 |
| iso-Butylbromide | 91.4 | 99.7 | 468 | 9.51 |
| sec-Butylbromide | 91.2 | 99.7 | 450 | 9.18 |
| Alicyclic hydrocarbons: | | | | |
| Cyclopentane | 49.3 | 99.7 | 115 | 2.35 |
|  |  | 55.8 | 352 | 2.92 |
| Cyclohexane | 80.7 | 99.7 | 247 | 5.08 |
|  |  | 79.7 | 418 | 6.25 |
| Methylcyclohexane | 100.9 | 99.7 | 371 | 7.63 |
| Aromatic: | | | | |
| Benzene | 80.1 | 99.7 | 448 | 9.20 |
|  |  | 79.7 | 804 | 11.1 |
| Toluene | 110.6 | 99.7 | 956 | 19.6 |
|  |  | 79.7 | 1,866 | 25.7 |
| Ethylbenzene | 136.2 | 99.7 | 1,823 | 37.4 |
|  |  | 79.7 | 4,370 | 42.8 |
| o-Xylene | 144.4 | 99.7 | 2,500 | 50.3 |
| m-Xylene | 139.1 | 99.7 | 2,067 | 41.5 |
| p-Xylene | 138.4 | 99.7 | 1,984 | 40.1 |
| Heterocyclic: | | | | |
| Thiophene | 84.4 | 99.7 | 586 | 11.5 |
|  |  | 79.7 | 1,080 | 14.9 |
| 1,4-dioxane | 101.4 | 99.7 | 820 | 16.7 |
|  |  | 79.7 | 1,566 | 21.6 |
| Alcohols: | | | | |
| Methanol | 64.7 | 99.7 | 59 | 1.20 |
|  |  | 79.7 | 83 | 1.14 |
| Ethanol | 78.4 | 99.7 | 106 | 1.90 |
|  |  | 79.7 | 149 | 2.05 |
| n-Propanol | 97.2 | 99.7 | 207 | 4.25 |
| iso-Propanol | 82.4 | 99.7 | 114 | 2.32 |
| n-Butanol | 118.0 | 99.7 | 447 | 9.16 |
| iso-Butanol | 108.0 | 99.7 | 309 | 6.32 |
| sec-Butanol | 99.5 | 99.7 | 253 | 5.15 |
| tert-Butanol | 82.9 | 99.7 | 129 | 2.63 |
| iso-Amyl alcohol | 132.0 | 99.7 | 742 | 15.1 |
| sec-Amyl alcohol | 119.9 | 99.7 | 478 | 9.74 |

Table 1—Continued

| Compound | B.P. (° C.) | Temp. | $R_v$ (ml./min. corr.) | $R_v/R_v$ (pentane) |
|---|---|---|---|---|
| Esters: | | | | |
| Ethyl acetate | 77.1 | 99.7 | 275 | 5.61 |
|  |  | 79.7 | 485 | 4.76 |
| n-Propyl acetate | 101.6 | 99.7 | 550 | 11.2 |
|  |  | 79.7 | 980 | 9.63 |
| n-Butyl acetate | 126.1 | 99.7 | 1,141 | 23.2 |
| Ketones: | | | | |
| Acetone | 56.1 | 99.7 | 149 | 3.01 |
|  |  | 55.8 | 468 | 3.88 |
| Methyl ethyl ketone | 79.6 | 99.7 | 302 | 6.08 |
|  |  | 79.7 | 522 | 5.13 |
| Methyl propyl ketone | 102.4 | 99.7 | 566 | 11.4 |
| Aldehydes: | | | | |
| Acetaldehyde | 20.2 | 99.7 | 73 | 1.45 |
|  |  | 24.7 | 446 | 1.62 |
| Propionaldehyde | 48.8 | 99.7 | 135 | 2.73 |
|  |  | 55.8 | 437 | 3.61 |
| Butryaldehyde | 74.7 | 99.7 | 284 | 5.74 |
| Ethers: | | | | |
| Diethyl | 34.6 | 99.7 | 74 | 1.53 |
|  |  | 24.7 | 594 | 2.15 |
| Di-n-propyl | 90.1 | 99.7 | 259 | 5.31 |
|  |  | 79.7 | 469 | 6.47 |
| Di-n-butyl | 142.4 | 99.7 | 1,013 | 20.8 |
| Allyl | 94.3 | 99.7 | 411 | 8.44 |
|  |  | 79.7 | 775 | 10.7 |

What is claimed is:

1. A mixture of approximately 70 weight percent bis-($\alpha$-x-tolyl-p-tolyl)ether and approximately 30 weight percent 2-methyl-1,4-bis((p-($\alpha$-x-tolyl-p-tolyloxy)benzyl))benzene.

2. A mixture of approximately 70 weight percent bis-($\alpha$-x-ethylphenyl-p-tolyl) ether and approximately 30 weight percent 2-ethyl-1,4-bis((p-$\alpha$-x-ethylphenyl-p-tolyloxy)benzyl))benzene.

3. An improved chromatographic adsorption medium comprising a major proportion of an inert particulate packing material and a minor proportion of a liquid condensation product of 4,4'-di(chloromethyl)diphenyl oxide with a benzenoid hydrocarbon having the formula $$R_1R_2R_3C_6H_3$$

wherein $C_6H_3$ represents a benzene moiety and $R_1$, $R_2$ and $R_3$ individually represent one of the group of hydrogen and alkyl groups having from 1 to 2 carbon atoms and at least one of which is hydrogen, said condensation products having from 1 to 2 diphenyl oxide moieties and from 2 to 3 benzenoid hydrocarbon moieties per molecule.

No references cited.

TOBIAS E. LEVOW, *Primary Examiner.*

UNITED STATES PATENT OFFICE
CERTIFICATE OF CORRECTION

Patent No. 3,189,558　　　　　　　　　　　　　　　　　June 15, 1965

James D. Doedens et al.

It is hereby certified that error appears in the above numbered patent requiring correction and that the said Letters Patent should read as corrected below.

In the grant, lines 1 and 2, for "James D. Doedens, of Midland, Howard P. Cordts, of Bay City, and David F. Wisniewski, of Auburn, Michigan," read --James D. Doedens, of Midland, Howard P. Cordts, of Bay City, and David F. Wisniewski, of Auburn, Michigan, assignors to The Dow Chemical Company, of Midland, Michigan, a corporation of Delaware, --; lines 11 and 12, for "James D. Doedens, Howard P. Cordts, and David F. Wisniewski, their heirs" read -- The Dow Chemical Company, its successors --; in the heading to the printed specification, lines 4 to 6, for "James D. Doedens, 20 Rosemary Court, Midland, Howard P. Cordts, 5448 Kasemeyer Road, Bay City, and David F. Wisniewski, 4869 Franklin St., Auburn, Mich." read -- James D. Doedens, Midland, Howard P. Cordts, Bay City, and David F. Wisniewski, Auburn, Mich., assignors to The Dow Chemical Company, Midland, Mich., a corporation of Delaware --; column 2, line 1, for "presents" read -- prevents --; column 4, Table I, third column, line 39 thereof, for "79.7" read -- 79.9 --.

Signed and sealed this 16th day of November 1965.

(SEAL)
Attest:

ERNEST W. SWIDER　　　　　　　　　　　　EDWARD J. BRENNER
Attesting Officer　　　　　　　　　　　　Commissioner of Patents